United States Patent [19]

Sakata

[11] Patent Number: 5,337,409

[45] Date of Patent: Aug. 9, 1994

[54] PARALLEL/SERIAL DATA CONVERSION SYSTEM

[75] Inventor: Yoshio Sakata, Yokohama, Japan

[73] Assignee: Kabushiki Kaisha Toshiba, Kawasaki, Japan

[21] Appl. No.: 860,319

[22] Filed: Mar. 30, 1992

[30] Foreign Application Priority Data

Jul. 31, 1991 [JP] Japan .................... 3-191877

[51] Int. Cl.⁵ .................... G06F 15/20
[52] U.S. Cl. .................... 395/162; 358/448; 345/197; 365/189.12
[58] Field of Search ........... 395/162, 164; 364/200, 364/900; 358/448, 456, 457; 365/189.01, 189.12; 340/768, 750, 798-800; 382/50, 54; 345/197

[56] References Cited

U.S. PATENT DOCUMENTS

| | | | |
|---|---|---|---|
| 4,532,557 | 7/1985 | Larkins | 358/147 |
| 4,809,216 | 2/1989 | Lai | 364/900 |
| 4,972,500 | 11/1990 | Ishii et al. | 358/457 |
| 5,148,294 | 9/1992 | Kurogane et al. | 358/448 |
| 5,157,773 | 10/1992 | Matsumoto et al. | 395/162 |

*Primary Examiner*—Arthur G. Evans
*Assistant Examiner*—Kee M. Tung
*Attorney, Agent, or Firm*—Cushman, Darby & Cushman

[57] ABSTRACT

32-bit image data transferred through an image data bus is input to a thinning out circuit through a bus I/F, and is thinned out by the thinning out circuit to have an active data width of 24 bits. The 32-bit data including the active data width of 24 bits obtained by the thinning out operation is supplied to a line buffer block. The line buffer block has a data width equal to or larger than the maximum bit width of the image data bus. The 32-bit data supplied to the line buffer block is directly written in the line buffer block. The data written in the line buffer block is repetitively shifted by a shift register block according to the active data width of 24 bits.

8 Claims, 3 Drawing Sheets

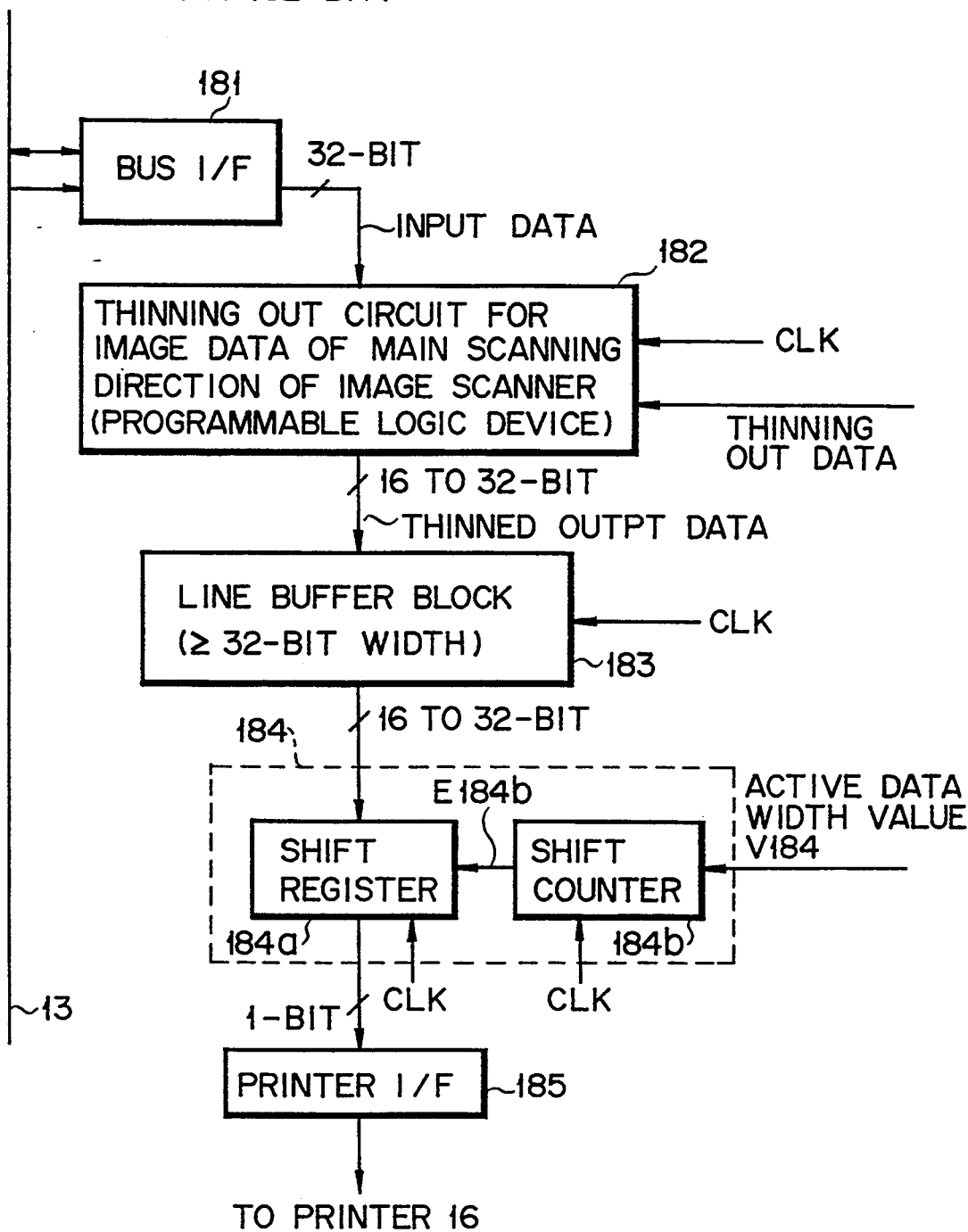
F I G. 2

FIG. 3A

| | | |
|---|---|---|
| THINNING OUT DATA | 00010001 | 00010001 |
| INPUT DATA | 11111111 | 11111111 |
| INTERNAL THINNED DATA | 111x1111 | x1111x11 |
| THINNED OUTPUT DATA | 11111111 | xxxxxxxx |

← 24 BITS → ← 8 BITS →

X····DON'T CARE

FIG. 3B

| | | |
|---|---|---|
| THINNING OUT DATA | 00010001 | 00010001 |
| INPUT DATA | 11011011 | 01101101 |
| INTERNAL THINNED DATA | 110x101x | 011x110x |
| THINNED OUTPUT DATA | 11010101 | xxxxxxxx |

← 24 BITS → ← 8 BITS →

FIG. 3C

| | | |
|---|---|---|
| THINNING OUT DATA | 01010101 | 01010101 |
| INPUT DATA | 11111111 | 11111111 |
| INTERNAL THINNED DATA | 1x1x1x1x | 1x1x1x1x |
| THINNED OUTPUT DATA | 11111111 | xxxxxxxx |

← 16 BITS → ← 16 BITS →

PARALLEL/SERIAL DATA CONVERSION SYSTEM

BACKGROUND OF THE INVENTION

1. Field of the Invention

The present invention relates to a data conversion system having a video interface function for serially transferring image data to, e.g., a printer or a display and, more particularly, to high-speed conversion from parallel data to serial data in an asynchronous data transfer mode in an image information apparatus or a document processing apparatus.

2. Description of the Related Art

A conventional image information equipment or document processing apparatus comprises an interface circuit for connection with a printer (printing device) or a CRT (display device). The interface circuit performs bit-width conversion since the data transfer rate or transfer bit width of an image data transfer bus of the equipment or apparatus is different from that of the printer or CRT, which receives image data.

In order to absorb a difference in transfer rate, a line buffer is used, and the write data width to this buffer is adjusted to the data width of the line buffer (data packing processing).

When a data width is converted to a 1-bit width, i.e., parallel data is converted into serial data in an asynchronous data transfer mode, data read out from a line buffer is written in a shift register, and is shifted in synchronism with a synchronization clock.

However, the packing (data width adjusting) processing for adjusting the write data width to the line buffer to the data width of the buffer requires a long period of time for writing data in the line buffer. For this reason, when the read frequency to the line buffer exceeds the write frequency, the buffer becomes empty during data transfer, and data transfer is disabled.

SUMMARY OF THE INVENTION

It is, therefore, an object of the present invention to provide a data conversion system, which can shorten the data write time, and can realize a high-speed serial transfer operation.

In order to achieve the above object, a data conversion system of the present invention comprises: a data transfer bus for transferring parallel data; a buffer, having a data width equal to or larger than a maximum bit width of the bus, for receiving the parallel data transferred by the bus, and means for shifting the parallel data stored in the buffer so as to convert the parallel data into serial data, in accordance with an active data width of the buffer.

With the above arrangement, since the buffer has a bit width equal to or larger than the number of bits of input parallel data, the input data can be instantaneously written in the buffer at one time. Further, since the shifting means performs parallel/serial conversion of the parallel data written in the buffer, write access to the buffer can be performed repeatedly during parallel/serial conversion which requires a relatively long period of time. Thus, data transfer processing can be prevented from being interrupted due to an empty state of the buffer during an output operation of the converted serial data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a diagram showing an arrangement of parallel/serial conversion unit 18 shown in FIG. 1;

FIGS. 3A to 3C are logic charts for explaining an operation of thinning out circuit 182 shown in FIG. 2.

DETAILED DESCRIPTION OF THE PREFERRED EMBODIMENTS

An embodiment of the present invention will be described hereinafter with reference to the accompanying drawings.

Figure 1:
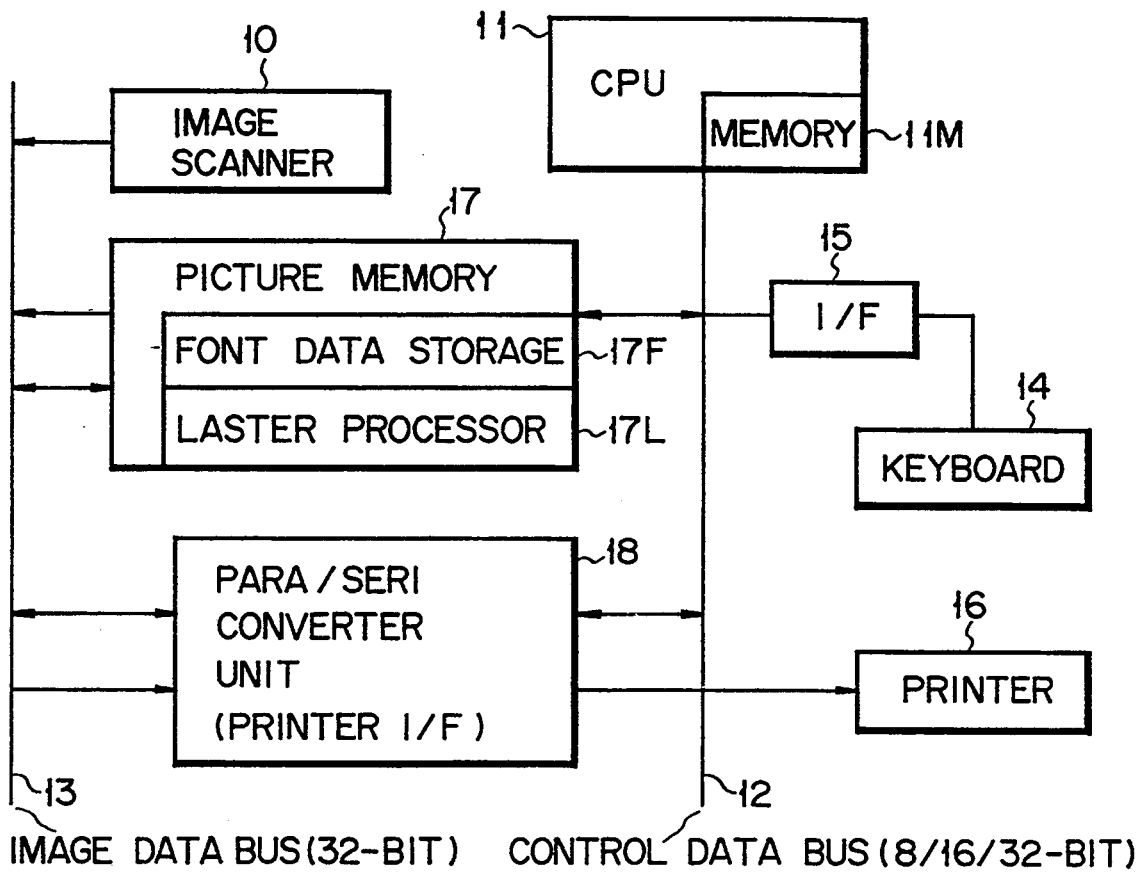
FIG. 1 is a schematic block diagram showing a data conversion system according to an embodiment of the present invention.
Figure 4:
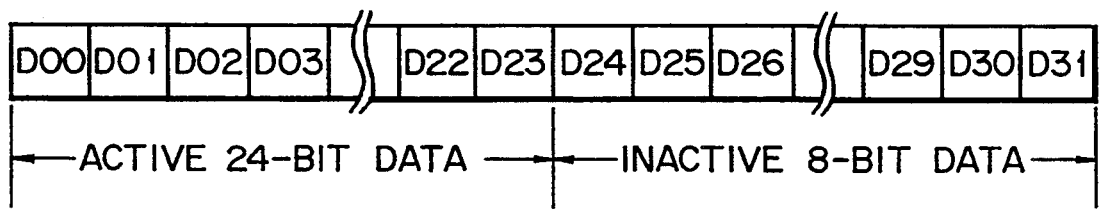
FIG. 4 shows a format of thinned out data output from thinning out circuit 182 shown in FIG. 2.

FIG. 1 shows principal part of an image information equipment or document processing apparatus according to the present invention.

More specifically, this apparatus comprises image scanner 10, CPU 11 for controlling the overall apparatus, control data bus 12 connected to CPU 11, image data bus 13, keyboard 14, interface circuit (I/F) 15 for connecting keyboard 14 and control data bus 12, printer 16 as a printing device, picture memory 17 connected between control data bus 12 and image data bus 13, printer I/F 18 arranged between control data bus 12 and image data bus 13, and connected to printer 16, and the like.

CPU 11 has internal memory (Mem) 11M used for executing, e.g., a control program.

Keyboard 14 is operated by an operator to input various operation commands and instructions.

Printer 16 prints out image data, read out from picture memory 17, and supplied through printer I/F 18, onto a recording sheet.

Picture memory 17 stores a document or figure drawn by CPU 11 according to operation commands input by an operator through keyboard 14. Picture memory 17 comprises laster processor 17L, and also includes font data storage 17F used for drawing characters.

Printer I/F 18 converts the transfer rate or transfer bit width of data supplied from picture memory 17 through image data bus 13 in correspondence with that of printer 16.

A case will be described below wherein the maximum bit width of image data bus 13 is assumed to be 32 bits, and 32-bit data is converted within a range between 16 bits to 32 bits.

FIG. 2 shows the internal arrangement of printer I/F 18.

More specifically, printer I/F 18 comprises bus I/F 181, thinning out circuit 182, line buffer block 183, shift register block 184, and printer I/F 185.

Bus I/F 181 supplies 32-bit image data transferred from image data bus 13 to thinning out circuit 182.

Thinning out circuit 182 has a function (in a thinning out printing mode) of converting main scanning components of 32-bit image data received by bus I/F 181 within a range between, e.g., 16 bits to 32 bits. Circuit 182 can comprise a programmable logic device assembled with the logic of a truth table shown in FIGS. 3A to 3C.

Line buffer block 183 has a data width equal to or larger than the maximum bit width (32 bits) of image data bus 13, and data from thinning out circuit 182 can be directly written in line buffer block 183. When the data width of buffer block 183 is 32 bits, buffer block 183 can be constituted by serially connecting four D-RAMs (128K×8 bits type) each having an 8-bit data width, and assigning identical addresses to them.

Shift register block 184 shifts data sequentially read out from line buffer block 183 in synchronism with synchronization clock CLK. Shift register block 184 comprises shift register 184a in which data from line buffer block 183 is written, and shift counter 184b for generating signal E184b for determining a shift count (continuously sequential bit shift) of shift register 184a. Active data width value V184 for determining the shift count in this case is set according to the data width in buffer block 183. Value V184 can be arbitrarily set up to a maximum of 32 bits. Normally, the active data width value coincides with an active data width of thinned out data from thinning out circuit 182.

Printer I/F 185 outputs serial data outputs converted into a 1-bit data width by shift register block 184 to printer 16.

The operation of printer I/F 18 will be described below with reference to thinning out printing processing.

Assume that 32-bit data (active data width=32 bits) transferred from image data bus 13 is converted into 24-bit data. Thinned out 32-bit data (active data width=24 bits) output from thinning out circuit 182 is written in line buffer block 183 while it includes 8-bit inactive (or arbitrary) data.

The 32-bit data written in line buffer block 183 is read out, and written in shift register 184a. In this case, the active data width is set to be 24 bits according to active data width value V184 input to shift counter 184b. For this reason, shift register 184a continuously shifts 0th bit to 23rd bit, and the 24th bit of shift register 184a loads next data from line buffer block 183. Upon repetition of this shift operation, 8-bit inactive data included in the output from thinning out circuit 182 is removed, and 24-bit parallel data including no inactive data is converted into 1-bit serial data.

In this manner, 32-bit image data from bus 13 can be written in line buffer block 183 without being subjected to bit conversion.

More specifically, the data width of line buffer block 183 is set to be equal to or larger than the maximum bit width of data on the image data bus, and the input data width of shift register block 184 is also set in correspondence with the active data width of data output from line buffer block 183. Since the data width of line buffer block 183 is sufficiently large, a time required for writing data in buffer block 183 is very short even without bit conversion, and the write frequency to line buffer block 183 can be increased to be larger than the read frequency. For this reason, data in line buffer block 183 can be prevented from being empty during a data transfer operation to the printer. Therefore, efficient write access of image data can be attained, and a high-speed serial transfer operation can be realized as a whole.

In the above embodiment, data transfer to the printer has been exemplified. However, the present invention is not limited to this, but may be applied to serial data transfer to a CRT.

Various changes and modifications may be made within the spirit and scope of the invention.

As described above, according to the present invention, an image data conversion system, which can shorten the data write time, and can realize high-speed serial transfer, can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A data processing apparatus comprising:
   means or scanning an object to provide N-bit image data, N being an integer larger than 1;
   means for transferring the N-bit image data obtained by said scanning means;
   means for thinning out N-M bits from N-bit parallel image data transferred from said transferring means so as to convert the N-bit parallel image data into thinned-out output data formed of M-bit active data and (N-M)-bit inactive data, M being an integer smaller than N;
   storing means for simultaneously storing all the bits of the thinned-out output data from said thinning out means; and
   means, responsive to the thinned-out output data stored in said storing means, for converting the M-bit active data of the thinned-out output data into 1-bit serial data, to thereby provide packed serial data, said converting means including:
   generating means for generating a continuous M-bit sequential shift instruction when data designating a value of the integer M is received, where the integer M is based on the number of active data bits in the thinned-out output; and
   shift register means for sequentially shifting continuous M bits of the thinned-out output data from said storing means based on the continuous M-bit sequential shift instruction generated by the generating means.

2. An apparatus according to claim 1, wherein said simultaneously storing means includes means for storing the M-bit active data and <N-M>-bit inactive data.

3. An image data conversion system comprising:
   means for transferring image data having a parallel data configuration;
   receiving means, having an active data width not less than a maximum bit width of said transferring means, for receiving the image data transferred by said transferring means in parallel, so as to store the received image data; and
   means for converting the received image data stored by said receiving means into a serial format in accordance with an active data width value which can be set up to a maximum value representing the maximum bit width of said transferring means, and which represents an active bit size of the received image data, said converting means including:

shift count means, to which the received image data stored by said receiving means is written, for performing a shift count form a specific value corresponding to the active bit size of the parallel receiving image data, so as to serially output contents of the written image data, and means for generating, based on the active data width value, a signal determining the shift count to be performed by said shift count means, and supply as the specific value the generated signal to said shift count means.

4. An image data processing apparatus in accordance with claim 3, further comprising:

an image scanner for providing N-bit parallel image data to the transferring means, N being an integer larger than 1; and wherein the converting means further comprises:

means for thinning out N-M bits from the N-bit parallel image data obtained by said image scanner so as to convert the N-bit parallel image data into thinned-out output data formed of M-bit active data and (N-M)-bit inactive data, M being an integer smaller than N; and means for simultaneously storing all the bits of the thinned-out output data from said thinning out means; and where the shift count means converts the M-bit active parallel data of the thinned-out output data into 1-bit serial data, based on the thinned-out output data stored in said storing means to thereby provide processed serial data.

5. An apparatus according to claim 3, wherein said converting means includes:

means for generating a continuous M-bit sequential shift instruction upon reception of data designating a value of the integer M; and where the shift count means shifts continuous M bits of the thinned-out output data from said storing means in accordance with the continuous M-bit sequential shift instruction.

6. An apparatus according to claim 4, wherein said simultaneously storing means includes means for storing the M-bit active data and <N-M>-bit inactive data.

7. A parallel/serial data conversion system comprising:

means, having a capacity for simultaneously processing parallel data having not less than an N-bit width, for storing input parallel data having not more than an N-bit width, N being an integer larger than 1; and means, responsive to the parallel data stored in said storing means, for converting M bits of the input parallel data into serial data, M being an integer smaller than N, wherein said converting means includes:

means for generating a continuous M-bit sequential shift instruction upon reception of data designating a value of the integer M; and shift register means for sequentially shifting continuous M bits of the input parallel data from said storing means in accordance with the continuous M-bit sequential shift instruction generated by said generating means.

8. A parallel/serial data conversion system according to claim 7, further comprising:

means for thinning out a predetermined number of bits from N bits of the input parallel data in accordance with predetermined thinning-out data so as to convert the input parallel data into thinned-out output data formed of M-bit active data and (N-M)-bit inactive data, the thinned-out output data serving as the input parallel data stored in said storing means.

* * * * *